US008044110B2

(12) United States Patent
Castellani et al.

(10) Patent No.: US 8,044,110 B2
(45) Date of Patent: Oct. 25, 2011

(54) OPTICAL FIBER WITH POLYMERIC COATING CROSSLINKED IN THE PRESENCE OF BOTH RADICAL AND CATIONIC PHOTOINITIATORS

(75) Inventors: Luca Castellani, Milan (IT); Emiliano Resmini, Milan (IT); Luigia Rossiello, Bitonto (IT); Raffaella Donetti, Milan (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 1284 days.

(21) Appl. No.: 10/558,377

(22) PCT Filed: May 29, 2003

(86) PCT No.: PCT/EP03/05655
§ 371 (c)(1),
(2), (4) Date: Dec. 20, 2006

(87) PCT Pub. No.: WO2004/106254
PCT Pub. Date: Dec. 9, 2004

(65) Prior Publication Data
US 2007/0122092 A1    May 31, 2007

(51) Int. Cl.
C08F 299/04   (2006.01)
C08F 126/02   (2006.01)
C08G 59/14    (2006.01)
B05D 5/06     (2006.01)

(52) U.S. Cl. ........ 522/104; 522/100; 522/102; 522/122; 526/301; 526/320; 427/163.2

(58) Field of Classification Search .................. 428/378; 522/100, 104, 102, 122
See application file for complete search history.

(56) References Cited

U.S. PATENT DOCUMENTS

| | | | |
|---|---|---|---|
| 4,156,035 A | 5/1979 | Tsao et al. | |
| 4,474,830 A | 10/1984 | Taylor | |
| 4,585,534 A | 4/1986 | Pasternack et al. | |
| 5,262,450 A | 11/1993 | Vara et al. | |
| 5,536,772 A | 7/1996 | Dillman et al. | |
| 5,985,952 A * | 11/1999 | Levy ............... | 522/102 |
| 6,042,943 A * | 3/2000 | Levy ............... | 428/378 |
| 6,169,126 B1 | 1/2001 | Szum et al. | |
| 7,750,060 B2 * | 7/2010 | Zahora et al. ....... | 522/97 |
| 2001/0008906 A1 * | 7/2001 | Chawla ............. | 522/90 |
| 2001/0048797 A1 | 12/2001 | Van Dijk et al. | |
| 2002/0187432 A1 | 12/2002 | Dawes et al. | |

FOREIGN PATENT DOCUMENTS

| | | |
|---|---|---|
| EP | 1 112 979 | 7/2001 |
| EP | 1 172 391 | 1/2002 |
| JP | 2000-336127 | 12/2000 |

(Continued)

*Primary Examiner* — D. Lawrence Tarazano
*Assistant Examiner* — Ricardo E Lopez
(74) *Attorney, Agent, or Firm* — Finnegan, Henderson, Farabow, Garrett & Dunner, L.L.P.

(57) ABSTRACT

Optical fiber has a glass portion and at least one coating of crosslinked polymer material surrounding the glass portion, the coating being obtained by crosslinking a composition of (a) at least one radically crosslinkable oligomer containing at least two reactive functional groups and having a number average molecular weight lower than about 1,000, preferably between about 400 and about 900; (b) at least one cationically crosslinkable compound containing at least one reactive functional group; (c) at least one free radical photoinitiator; and (d) at least one cationic photoinitiator. Preferably, the coating is a secondary coating or, in the case of a ribbon of optical fibers, it is a common polymer coating known as a "common coating".

65 Claims, 2 Drawing Sheets

FOREIGN PATENT DOCUMENTS

| | | |
|---|---|---|
| WO | WO 91/03498 | 3/1991 |
| WO | WO 92/03483 | 3/1992 |
| WO | WO 96/02596 | 2/1996 |
| WO | WO 97/18493 | 5/1997 |
| WO | WO 98/50317 | 11/1998 |
| WO | WO/9850317 | 11/1998 |
| WO | WO 99/67180 | 12/1999 |
| WO | WO 01/98817 | 12/2001 |
| WO | WO 01/98817 A2 | 12/2001 |
| WO | WO 03/057645 | 7/2003 |

* cited by examiner

OPTICAL FIBER WITH POLYMERIC COATING CROSSLINKED IN THE PRESENCE OF BOTH RADICAL AND CATIONIC PHOTOINITIATORS

CROSS REFERENCE TO RELATED APPLICATION

This application is a national phase application based on PCT/EP2003/005655, filed May 29, 2003, the content of which is incorporated herein by reference.

BACKGROUND OF THE INVENTION

1. Field of the Invention

The present invention relates to an optical fiber comprising at least one polymeric coating crosslinked in the presence of both radical and cationic photoinitiators.

More particularly, the present invention relates to an optical fiber comprising a glass portion and at least one coating of crosslinked polymer material surrounding said glass portion, said coating being obtained by crosslinking a composition comprising at least one radically crosslinkable oligomer containing at least two reactive functional groups; at least one cationically crosslinkable compound containing at least one reactive functional group; at least one free radical photoinitiator; at least one cationic photoinitiator.

Moreover, the present invention relates to a crosslinkable composition that may be applied as said coating.

2. Description of the Related Art

Optical fibers commonly consist of a glass portion (typically with a diameter of about 125 μm), inside which the transmitted optical signal is confined, and of a coating, typically polymeric, surrounding the glass portion for essentially protective purposes. This protective coating typically comprises a first layer of coating positioned directly on the glass surface, known as the "primary coating" or "primary" for short, typically having a thickness of between about 25 μm and about 35 μm. In turn, this primary coating is generally covered with a second layer of coating, known as the "secondary coating" or "secondary" for short, typically having a thickness of between about 10 μm and about 35 μm.

These polymer coatings may be obtained from crosslinkable compositions comprising oligomers and monomers that are generally crosslinked by means of UV irradiation in the presence of suitable photoinitiators. The two coatings described above differ, inter alia, in terms of the modulus of elasticity of the crosslinked material. As a matter of fact, whereas the material which forms the primary coating is a relatively soft material, with a relatively low modulus of elasticity at room temperature, the material which forms the secondary coating is relatively harder, having higher modulus of elasticity at room temperature. The combination of said two layers of coating ensures adequate mechanical protection for the optical fiber.

The optical fiber thus composed has a total diameter of about 250 μm. However, for particular applications, this total diameter may also be smaller; in this case, a coating of reduced thickness is generally applied.

In addition, where one and the same cable internally contains several optical fibers, the operator must be able to identify the different fibers with certainty, hence it is convenient to colour the various fibers with different identifying colours. Typically, an optical fiber is colour-identified by surrounding the secondary coating with a third coloured polymer layer, commonly known as "ink", having a thickness typically of between about 2 μm and about 10 μm, or alternatively by introducing a coloured pigment directly into the formulation of the secondary coating.

Optionally, the coloured fibers can be then combined into groups of several fibers, typically in the form of fiber optic ribbons, to facilitate their insertion into and recognition within a cable.

Typically from 4 to 24 optical fibers are arranged in parallel to form a fiber optic ribbon and are then covered with a single covering known as the "common coating", of composition and physical properties similar to those of the secondary coating.

Different crosslinkable compositions useful as coatings for optical fibers have been already disclosed.

For example, patent U.S. Pat. No. 5,262,450 relates to a radiation curable composition comprising about 50-90 parts by weight, preferably about 60-80 parts by weight, of a multifunctional acrylate monomer, suitably with 3-6 acrylates groups, preferably pentaerythritol triacrylate or trimethylolpropane triacrylate; about 10-50 parts by weight, preferably about 20-40 parts by weight, of a divinyl ether monomer having both a hydrophobic backbone and an abrasion-resistant moiety, which is preferably the divinylether of cyclohexane dimethanol, and a radiation curing initiator, suitably a cationic initiator, and preferably, in combination with a free radical initiator. The abovementioned composition is said to provides coatings which are abrasion and water-resistant which may be applied to glass, including fiberglass and glass fiber optics.

International Patent Application WO 97/18493 relates to a removable matrix for retaining one or more optical fibers which have an outermost layer made of a first polymer having a first initiator system, e.g. a free-radical initiated, ultraviolet curable acrylate polymer, the matrix comprising a second polymer having a second initiator system substantially different from the first initiator system, e.g. a cationically initiated, ultraviolet curable vinyl ether polymer. In a further embodiment, the matrix also comprises a partial adhesion promoting amount of a free-radical initiated, radiation curable polymer. The abovementioned matrix is said to permit an easy removal of the fibers from the ribbon.

International Patent Application WO 96/02596 relates to a vinyl ether-containing composition polymerizable by actinic, γ-ray, or electron beam radiation comprising: (a) an oligomer or a mixture of oligomers which are monofunctional, multifunctional, or a mixture of both monofunctional and multifunctional oligomers, and which have a reactive functionality selected from the group consisting of epoxy, acrylate, vinyl ether, maleate, or mixtures thereof; (b) monomers which are monofunctional, multifunctional, or a mixture of both monofunctional and multifunctional monomers, and which have a reactive functionality selected from the group consisting of epoxy, acrylate, vinyl ether, maleate, or mixtures thereof, wherein at least one of (a) or (b) must contain a vinyl ether functionality; (c) a photoinitiator, optionally including a sensitizer, selected from the group consisting of a cationic photoinitiator and a radical photoinitiator; and (d) a thermal oxidation stabilizer. A dual photoinitiator system, i.e having both radical and cationic photoinitiator, may be used. The abovementioned composition is said to be useful both as a primary coating and as a secondary coating for an optical fiber.

Japanese Patent Application 2000-336127 relates to a photo-curable resin composition comprising: (a) an oligomer which has ethylenically unsaturated groups; (b) a cationically polymerizable diluent monomer; (c) a photo-cationic polymerization initiator; and (d) a photo-radical polymerization initiator. The abovementioned composition is said to have excellent curing properties with a low exposure to ultraviolet radiation, even in the presence of oxygen and, when used as a coating for an optical fiber, it is possible to achieve high productivity. Furthermore, the above mentioned composition is said to have excellent heat resistance and moisture resistance and, consequently, it is said to be particularly useful as a coating material for optical fibers.

SUMMARY OF THE INVENTION

The Applicant has found, however, that the crosslinkable compositions above disclosed may have poor mechanical properties (in particular, modulus of elasticity, elongation at break and stress at break) and, consequently, may not ensure adequate mechanical protection for the optical fibers. Therefore, the optical fibers may be subjected to deformations which cause microbending losses. In particular, the Applicant has found that compositions crosslinkable in the presence of both radical and cationic photoinitiators wherein the radically crosslinkable oligomer has a high number average molecular weight (i.e. higher than 1000) are endowed with poor mechanical properties.

The Applicant has thus found that the use of a radically crosslinkable oligomer having a low number average molecular weight (i.e. lower than about 1,000) makes it possible to obtain a crosslinkable composition which allows to overcome the above reported drawbacks and allows to obtain a fiber optic coating, in particular a secondary coating, having good mechanical properties with a consequent improvement in the optical fiber protection. Moreover, said coating shows a good adhesion both to a primary coating, both radically or cationically crosslinked, and to a third coloured layer optionally present.

According to a first aspect, the present invention thus relates to an optical fiber comprising a glass portion and at least one coating of crosslinked polymer material surrounding said glass portion, said coating being obtained by crosslinking a composition comprising:
(a) at least one radically crosslinkable oligomer containing at least two reactive functional groups and having a number average molecular weight lower than about 1,000, preferably between about 400 and about 900;
(b) at least one cationically crosslinkable compound containing at least one reactive functional group;
(c) at least one free radical photoinitiator;
(d) at least one cationic photoinitiator.

Said number average molecular weight may be determined by known techniques such as, for example, by gel permeation chromatography (GPC).

According to one preferred embodiment, said coating is a secondary coating surrounding a primary coating.

According to a further aspect, the present invention relates to a ribbon of optical fibers arranged in parallel and enclosed in a common coating of crosslinked polymer material, said common coating being obtained by crosslinking a composition comprising:
(a) at least one radically crosslinkable oligomer containing at least two reactive functional groups and having a number average molecular weight lower than about 1,000, preferably between about 400 and about 900;
(b) at least one cationically crosslinkable compound containing at least one reactive functional group;
(c) at least one free radical photoinitiator;
(d) at least one cationic photoinitiator.

The optical fibers of said ribbon are coated with a primary coating and with a secondary coating. According to one preferred embodiment, said secondary coating is a coating of crosslinked polymer material as defined above.

According to a further aspect, the present invention relates to a crosslinkable composition comprising:
(a) at least one radically crosslinkable oligomer containing at least two reactive functional groups and having a number average molecular weight lower than about 1,000, preferably between about 400 and about 900;
(b) at least one cationically crosslinkable compound containing at least one reactive functional group;
(c) at least one free radical photoinitiator;
(d) at least one cationic photoinitiator.

According to a further embodiment, said composition further comprises (e) at least one radically crosslinkable oligomer containing at least one reactive functional group and having a number average molecular weight higher than about 1,000, preferably between about 1,500 and about 8,000.

Said number average molecular weight may be determined by known techniques such as, for example, by gel permeation chromatography (GPC).

According to a further embodiment, said composition further comprises (f) at least one release agent.

According to one preferred embodiment, said composition has a viscosity of between about 1,000 mPa·s and about 4,000 mPa·s, preferably between about 1,500 mPa·s and about 3,000 mPa·s, in a temperature range of from about 25° C. to about 80° C.

Said Brookfield viscosity is measured by using a Brookfield rheometer type, model DV-III, equipped with a configuration 29: further details regarding the analysis method will be described in the examples given below.

According to one preferred embodiment, said polymer material has a modulus of elasticity at −40° C. of between about 1,500 MPa and about 4,000 MPa, preferably between about 2,500 MPa and about 3,500 MPa; at +25° C. of between about 500 MPa and about 2,000 MPa, preferably between about 650 MPa and about 1,500 MPa; at +60° C. of between about 30 MPa and about 300 MPa, preferably between about 40 MPa and about 150 MPa.

According to a further preferred embodiment, said polymer material has a glass transition temperature ($T_g$) of between about 45° C. and about 85° C., preferably between about 50° C. and about 70° C.

Said modulus of elasticity and said glass transition temperature ($T_g$) are measured using DMTA apparatus (Dynamic Mechanical Thermal Analyzer from Reometrics Inc.), at a frequency of 1 Hz and at a heating rate of 2° C./min: further details regarding the analysis method will be described in the examples given below.

Preferably, said coating has a refractive index at room temperature higher than the refractive index of the glass portion, preferably higher than about 1.47.

Preferably, said coating has a thickness of between about 10 μm and about 70 μm, preferably between about 20 μm and about 35 μm.

The radically crosslinkable oligomer (a) usually comprises a carbon-containing backbone structure to which the reactive functional group(s) are bound.

Examples of suitable carbon-containing backbone structure include polyethers, polyolefins, polyesters, polyamides, polycarbonates, polyacrylates. The size of the carbon-containing backbone can be selected to provide the desired molecular weight.

For example, the carbon-containing backbone of the radically crosslinkable oligomer (a) may comprise aromatic groups and ring-opened epoxy groups or alkoxy groups. The oligomer may be represented, for example, by the following formulae:

R-L-Ar-L-R wherein R is a radiation-curable functional group, Ar is an aromatic group containing moiety, and L is a linking group.

Examples of suitable linking groups include alkoxy or ring opened epoxy such as ethoxy, propoxy, butoxy, and repeat units thereof. L can also be a urethane or urea linking group. Preferably, said urethane or urea linking group is present in an amount less than about 5% by weight, more preferably less than about 3% by weight, with respect to the total weight of the oligomer. Even more preferably, said urethane or urea linking group is not present.

The aromatic groups may be, for example, derived from bisphenol units, such as bisphenol A or bisphenol F.

According to one preferred embodiment, the radically crosslinkable oligomer (a) is a diglycidyl ether derivative of bisphenol A to which acrylate functional groups have been bound. Preferably, the radically crosslinkable oligomer (a) is a bisphenol A epoxy diacrylate.

According to one preferred embodiment, the radically crosslinkable oligomer (a) is present in the composition according to the present invention in an amount of from about 30% by weight to about 90% by weight, preferably from about 40% by weight to about 80% by weight, with respect to the total weight of (a)+(b)+(e).

Examples of radically crosslinkable oligomers (a) which may be used in the present invention and which are currently commercially available are the product Ebecryl® 600 or Ebecryl® 3700 from UCB Chemical, or Viscoat® 630 from Nippon Carbide.

According to one preferred embodiment, the cationically crosslinkable compound (b) usually has at least one reactive functional group selected from epoxy, vinyl ether, maleate, or mixtures thereof. Preferably, the functional group is vinyl ether.

According to a further preferred embodiment, the cationically crosslinkable compound (b) is selected from vinyl ether terminated ester compounds having the following general formula:

wherein:
n is an integer from 1 to 4 inclusive;
Y is a mono- di-, tri, or tetra-functional radical having a molecular weight of from about 12 to about 500 and is independently selected from the group consisting of alkyl, aryl, arylalkyl, or cycloalkyl radical;
X is a divalent radical having a molecular weight of from about 25 to about 500, each X being independently selected from the group consisting of alkylene or cycloalkylene radicals;
$R_1$ and $R_2$, are monovalent radicals which are independently selected from the group consisting of hydrogen, or alkyl groups having from 1 to 20 carbon atoms, preferably independently selected from hydrogen or methyl group.

According to a further preferred embodiment, the cationically crosslinkable compound (b) is selected from vinyl ether terminated ether monomers having the following general formula:

wherein:
n is an integer from 1 to 4 inclusive;
D is mono-, di-, tri-, or tetra-valent radical selected from the group consisting of alkyl, cycloalkyl, or alkyl ethers having a molecular weight of from about 56 to about 1,000;
$R_3$ and $R_4$, are monovalent radicals which are independently selected from the group consisting of hydrogen or alkyl groups having from 1 to 20 carbon atoms, preferably independently selected from hydrogen or methyl group.

Preferably, the cationically crosslinkable compound (b) is a vinyl ether terminated ester compound.

According to one preferred embodiment, the cationically crosslinkable compound (b) is present in the composition according to the present invention in an amount of from about 10% by weight to about 70% by weight, preferably from about 20% by weight to about 60% by weight, with respect to the total weight of (a)+(b)+(e).

Examples of cationically crosslinkable compounds (b) which may be used in the present invention and which are currently commercially available are the products Vectomer® 4020, Vectomer® 4010 or Vectomer® 5015 from Morflex Inc.

According to one preferred embodiment, the free radical photoinitiator (c) may be selected from radical photo-initiators known as Norrish Type I and Norrish Type II.

At least one homolytic fragmentation photointiator (also known as Norrish Type I), which operates via the cleavage of intramolecular bonds, is preferably present in the crosslinkable composition of the present invention.

Examples of Norrish Type I photoinitiators which may be advantageously used in the present invention may be selected from benzoin derivatives, methylbenzoin derivatives or 4-benzoyl-1,3-dioxolane derivatives, benzyl ketals, (α,α-dialkoxy)acetophenones, (α-hydroxy)alkyl-phenones, (α-amino)alkylphenones, acylphosphine oxides, acylphosphine sulphides, o-acyl-α-oximino ketones, halogenated acetophenone derivatives, benzoyldiaryl-phosphine oxides, or mixtures thereof. Said photoinitiators may be used as such or mixed together.

Norrish Type 1 photoinitiators which may be used in the present invention and that are commercially available are the product Darocur® 1173. (2-hydroxy-2-methyl-1-phenylpropan-1-one as the active component) from Ciba, Irgacure® 184 (hydroxycyclohexylphenyl ketone as active component) from Ciba, Irgacure® 907 (2-methyl-1-(4-methylthio)phenyl-2-morpholinopropan-1-one as active component) from Ciba, Irgacure® 369 (2-benzyl-2-dimethylamino-1-(morpholinophenyl)-butanone-1 as active component) from Ciba, acylphosphines such as, for example, Lucirin® TPO (2,4,6-trimethylbenzoyldiphenylphosphine oxide) from BASF, or Irgacure® 1700 (bis(2,6-dimethoxybenzoyl)-2,2,4-trimethylpentylphosphine oxide) from Ciba.

Examples of Norrish Type II photoinitiators (involving hydrogen abstraction) which may be advantageously used in the present invention may be selected from aromatic ketones such as, for example, benzophenone, xanthone, benzophenone derivatives, Michler's ketones, thioxanthones or other xanthone derivatives such as, for example, ITX (isopropyl thioxanthone), or mixtures thereof. The Type II photoinitiators are generally used in the presence of a synergistic amine.

According to one preferred embodiment, the free radical photoinitiator (c) is present in the composition according to the present invention in an amount of from about 0.01 parts by weight to about 10 parts by weight, preferably from about 0.05 parts by weight to about 8 parts by weight, with respect to 100 parts by weight of (a)+(b)+(e).

According to one preferred embodiment, the cationic photoinitiator (d) is selected from triarylsulphonium salts or diaryliodonium salts having non-nucleophilic anions such as, for example: hexafluorophosphorus triarylsulphonium salts, hexafluoroantimony triarylsulphonium salts, (tolylcumyl) tetrakis(pentafluorophenyl) iodonium salts, diaryl iodonium hexafluoroantimonate salts, 4-isobutylphenyl-4'-methylphenyliodonium hexafluorophosphorus salts, or mixtures thereof.

According to one preferred embodiment, the cationic photoinitiator (d) is present in the composition according to the present invention in an amount of from about 0.05 parts by weight to about 5 parts by weight, preferably from about 0.25 parts by weight to about 2 parts by weight, with respect to 100 parts by weight of (a)+(b)+(e).

Examples of cationic photoinitiators (d) which may be used in the present invention and which are commercially available are the products Cyracure® UVI-6990 or UVI® 6974 from Union Carbide, or CGI® 552 from Ciba.

In addition to the free radical photoinitiator (c) and the cationic photoinitiator (d), if necessary, at least one photosensitizer (g) may be added to the crosslinkable composition according to the present invention.

The photosensitizer (g) may be selected, for example, from: amines, ureas, phosphorus compounds, sulfur compounds, nitrils, or mixtures thereof. Specific example of photo-sensitizers which may be used according to the present invention are: triethylamine, diethylaminoethyl methacrylate, N-methyldiethanolamine, 4-dimethylaminoethyl benzoate, 4-dimethylaminoisoamyl benzoate, 4,4'-bisdiethylaminobenzophenone, Ubecryl® P104 (a high molecular tertiary amine compound manufactured by UCB Chemicals), or mixtures thereof.

According to one preferred embodiment, the photosensitizer (g) is present in the composition according to the present invention in an amount of from about 0.1 parts by weight to about 5 parts by weight, preferably from about 0.4 parts by weight to about 2 parts by weight, with respect to 100 parts by weight of (a)+(b)+(e).

As disclosed above, in order to further modify the mechanical properties of the composition of the present invention, in particular in the case of the common coating, said composition further comprises (e) at least one radically crosslinkable oligomer containing at least one reactive functional group having a number average molecular weight higher than 1,000, preferably between about 1,500 and about 10,000.

According to one preferred embodiment, the radically crosslinkable oligomer (e) may be selected from ethylenically unsaturated urethanes.

According to the ethylenically unsaturated urethanes may be obtained by reacting the following compounds:
(A) at least one polyol compound comprising a structural unit represented by the following formula (I):

wherein n is an integer comprised from 0 to 4 inclusive; $R_1$, $R_2$, $R_3$, $R_4$, $R_5$ and $R_6$, which may be equal or different from each other, represent a hydrogen atom or a $C_1$-$C_4$ alkyl group;
(B) at least one isocyanate compound; and
(C) at least one (meth)acrylate compound containing at least one hydroxyl group.

Polyol type compounds (A) particularly preferred according to the present invention are the following: compounds obtained by polymerizing at least one compound selected from ethylene glycol, propylene glycol, tetramethylene glycol, 2-alkyl-1,4-butanediol and 3-alkyl-1,4-butanediol; compounds obtained by ring-opening polymerization of 2-alkyl-tetrahydrofuran or 3-alkyl-tetrahydrofuran; compounds obtained by copolymerization of 2-alkyl-tetrahydrofuran, 3-alkyl-tetrahydrofuran or 2-alkyl-1,4-butanediol, with a cyclic ether such as ethylene oxide, propylene oxide or tetrahydrofuran; or mixtures thereof. Preferably, the polyol type compound (A) is selected from polytetramethylene glycol, polypropylene glycol, copolymer of tetramethylene glycol, or polypropylene glycol.

Preferably, said polyol type compound (A) has a number average molecular weight of between about 200 and about 6,000, preferably of between about 300 and about 4,000.

Isocyanate compounds (B) which may be used according to the present invention, may be selected from: 2,4-tolylenediisocyanate, 2,6-tolylenediisocyanate, 1,3-xylenediisocyanate, 1,4-xylene-diisocyanate, 1,5-naphthalenediisocyanate, m-phenylene-diisocyanate, p-phenylenediisocyanate, 3,3'-dimethyl-4,4'-diphenylmethanediisocyanate, 4,4'-diphenylmethanediiso-cyanate, 3,3'-dimethyl-phenylenediisocyanate, 4,4'-biphenylenediisocyanate, 1,6-hexamethylenediisocyanate, isophorone-diisocyanate, methylenebis(4-cyclohexyliso-cyanate), 2,2,4-trimethylhexamethylenediisocyanate, 2,4,4-trimethylhexamethylenediisocyanate, 1,4-hexa-methylene-diisocyanate, bis(2-isocyanateethyl)-fumarate, 6-iso-propyl-1,3-phenyldiisocyanate, 4-diphenylpropaneiso-cyanate, lysinediisocyanate, or mixtures thereof. 2,4-Tolylenediisocyanate and 2,6-tolylenediisocyanate, isophoronediisocyanate, are preferred.

(Meth)acrylate compounds having at least one hydroxyl group (C) which may be used according to the present invention, may be selected from: 2-hydroxyethyl (meth)acrylate, 2-hydroxypropyl(meth)-acrylate, 2-hydroxy-3-phenyloxypropyl(meth)-acrylate, propanediol (meth)acrylate, 1,4-butanediol mono(meth) acrylate, 2-hydroxyalkyl(meth)acryloyl phosphate, 4-hydroxycyclohexyl (meth)acrylate, 1,6-hexanediol mono(meth)acrylate, neopentylglycol mono (meth)acrylate, trimethylolpropane di(meth)-acrylate, trimethylolethane di(meth)acrylate, pentaerythrithol tri (meth)acrylate, dipenta-erythritol penta(meth) acrylate; or mixtures thereof. 2-Hydroxyethyl acrylate and 2-hydroxypropyl acrylate are preferred.

According to one preferred embodiment, the radically crosslinkable oligomer (e) is present in the composition according to the present invention in an amount of from about 0% by weight to about 30% by weight, preferably from about 0.1% by weight to about 20% by weight, with respect to the total weight of (a)+(b)+(e).

Radically crosslinkable oligomers (e) which may be used according to the present invention and which are commercially available are the products Ebecryl® 230 from UCB Chemical or BR® 304 from Bomar Specialties.

As disclosed above, in order to allow an easy access to the optical fibers, in particular in the case of the common coating, the composition of the present invention, further comprises (f) at least one release agent.

Said release agent (f) may be either of reactive or non-reactive type.

According to one preferred embodiment, the release agent (f) of reactive type may be selected from acrylated silicones, vinyl-functional silicones, mercapto-functional silicones, (meth)acrylate-functional fluorocarbons, vinyl-functional fluorocarbons, mercapto-functional fluorocarbons, or mixtures thereof.

According to one preferred embodiment, the release agent (f) of reactive type is present in the composition according to the present invention in an amount of from about 0 parts by weight to about 15 parts by weight, preferably from about 0.2 parts by weight to about 10 parts by weight, with respect to 100 parts by weight of (a)+(b)+(e).

Examples of release agents (f) of reactive type which may be used according to the present invention and which are commercially available are the products Tegomer® 2100, 2200, 2500 from Tego Chemie, Byk® 371 from Byk Chemie, or Ebecryl® 350 from UCB Chemical.

According to one preferred embodiment, the release agent (f) of non-reactive type may be selected from silicone copolymers, hydrocarbon-like paraffin wax, fluorocarbons, or mixtures thereof.

According to one preferred embodiment, the release agent (f) of non-reactive type is present in the composition according to the present invention in an amount of from about 0 parts by weight to about 3 parts by weight, preferably from about 0.1 parts by weight to about 2 parts by weight, with respect to 100 parts by weight of (a)+(b)+(e).

Examples of release agents (f) of non-reactive type which may be used according to the present invention and which are commercially available are the products Coatosil® from Osi Specialties.

A mixture of release agent (f) of reactive and non-reactive type may also be used.

For the purpose of improving the fundamental properties of the abovementioned composition, further additives may optionally be added. For example, solvents, plasticizers, dies, expansion agent, devolatilizers, opacifiers, rheological agents, antioxidants, UV stabilizers that are capable of not interfering with the crosslinking operations, temperature-mediated polymerization inhibitors, levelling agents, may be added.

As already reported above, when one and the same cable internally contains several optical fibers, the operator must be able to identify the different fibers with certainty, hence it is convenient to colour the various fibers with different identifying colours. Accordingly, the coating composition may further comprise conventional dyes and/or pigments for providing the desired colours of the material.

Instead of colouring the protective coating layer, the optical fiber according to the present invention, may be colour-identified by surrounding the protective coating layer with an additional coloured polymer layer, commonly known as "ink", having a thickness typically between about 3 μm and about 10 μm, preferably of about 5 μm and about 8 μm. Examples of resins useful in order to produce said coloured polymer layer are commercialized under the tradename of Cablelite® by DSM.

BRIEF DESCRIPTION OF THE DRAWINGS

The present invention may be understood more clearly with reference to the following attached figures.

DETAILED DESCRIPTION Of THE INVENTION

Figure 1:
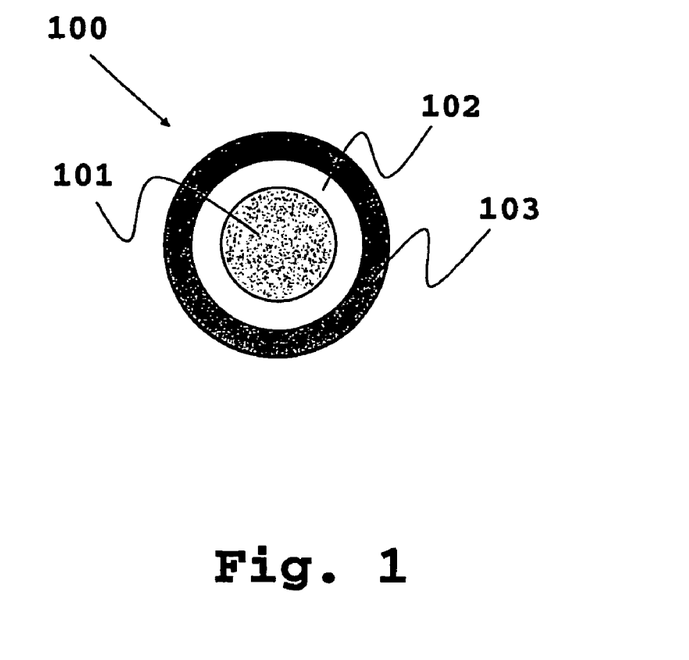
FIG. 1: is a view in cross section of an optical fiber.

FIG. 1 shows an optical fiber (100) comprising a glass portion (101) covered with a primary coating (102) which is in its turn covered with a secondary coating (103).

Figure 2:
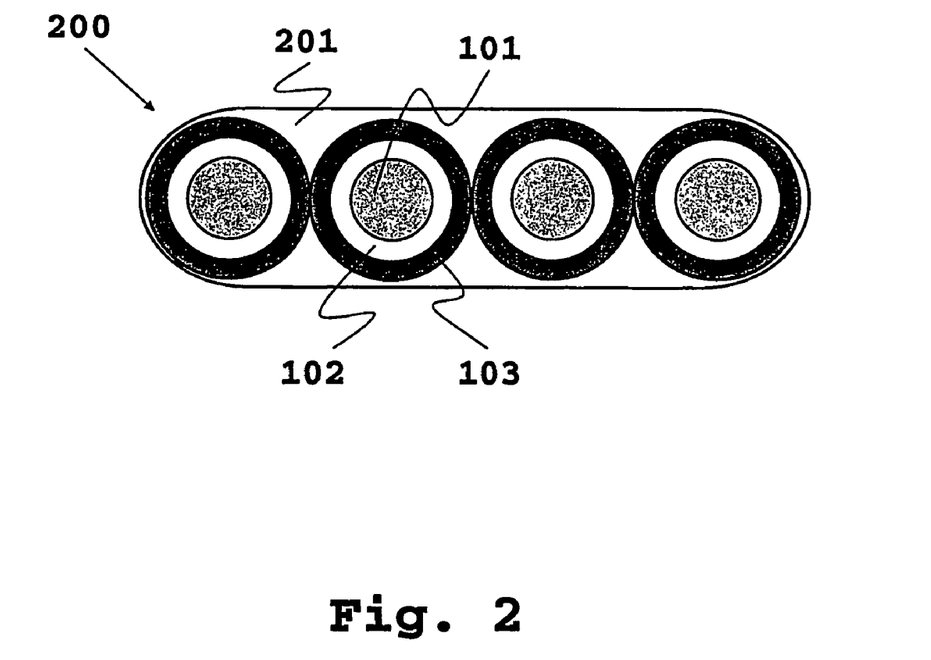
FIG. 2: is a view in cross section of a ribbon of optical fibers comprising several optical fibers.

FIG. 2 shows several optical fibers of the type given in FIG. 1, combined in the form of a ribbon (200) by means of enclosing them in a common polymer coating (201), known as a "common coating".

A secondary coating (103) and a common polymer coating (201) may be produced by means of crosslinking a composition according to the present invention. As disclosed above, said composition comprises:

(a) at least one radically crosslinkable oligomer containing at least two reactive functional groups and having a number average molecular weight lower than about 1,000, preferably between about 400 and about 900;

(b) at least one cationically crosslinkable compound containing at least one reactive functional group;

(c) at least one free radical photoinitiator;

(d) at least one cationic photoinitiator.

A more detailed description of said composition is above reported.

The composition is therefore subjected to crosslinking by working as described in the prior art such as, for example, in U.S. Pat. No. 4,156,035. Said crosslinking may be carried out, for example, by exposure to UV radiation.

The crosslinked composition obtained is particularly useful as a secondary coating or common coating for an optical fiber. Said secondary coating generally surrounds a primary coating compatible therewith.

Said primary coating may be radically or cationically crosslinked.

Typically, a radically crosslinkable primary coating comprises at least one oligomer containing (meth)acrylate end groups, at least one diluent monomer of acrylic type and at least one free radical photoinitiator.

A typical radically crosslinkable liquid composition for a primary coating comprises about 50%-65% by weight of urethane acrylate, about 30%-50% by weight of reactive diluent monomer, about 0.5%-2% by weight of free radical photoinitiator, about 0.5%-5% by weight of other additives.

Crosslinkable compositions for the primary coating of the type such as those described above which may be used in the present invention are commercially available, for example, under the tradename Desolite® from DSM such as, for example, the commercial Desolite® composition indicated by the code 3471-1-129.

A cationically crosslinkable primary coating which may be used in the present invention is disclosed, for example, in International Patent Application PCT/IB01/02326 in the name of the Applicant. Said primary coating may be obtained by crosslinking a radiation curable composition comprising:

at least one epoxidized polydiene oligomer having a first and a second end, the said oligomer comprising at least one hydrocarbon chain that is substantially free of ethylenic double bonds, at least one epoxide group at the said first end and at least one reactive functional group at the said second end;

at least one hydrogenated polydiene oligomer comprising at least one reactive functional group capable of reacting with the said epoxide groups;

at least one cationic photoinitiator.

A more detailed description of said crosslinkable composition may be found in the abovementioned International Patent Application.

Figure 3:
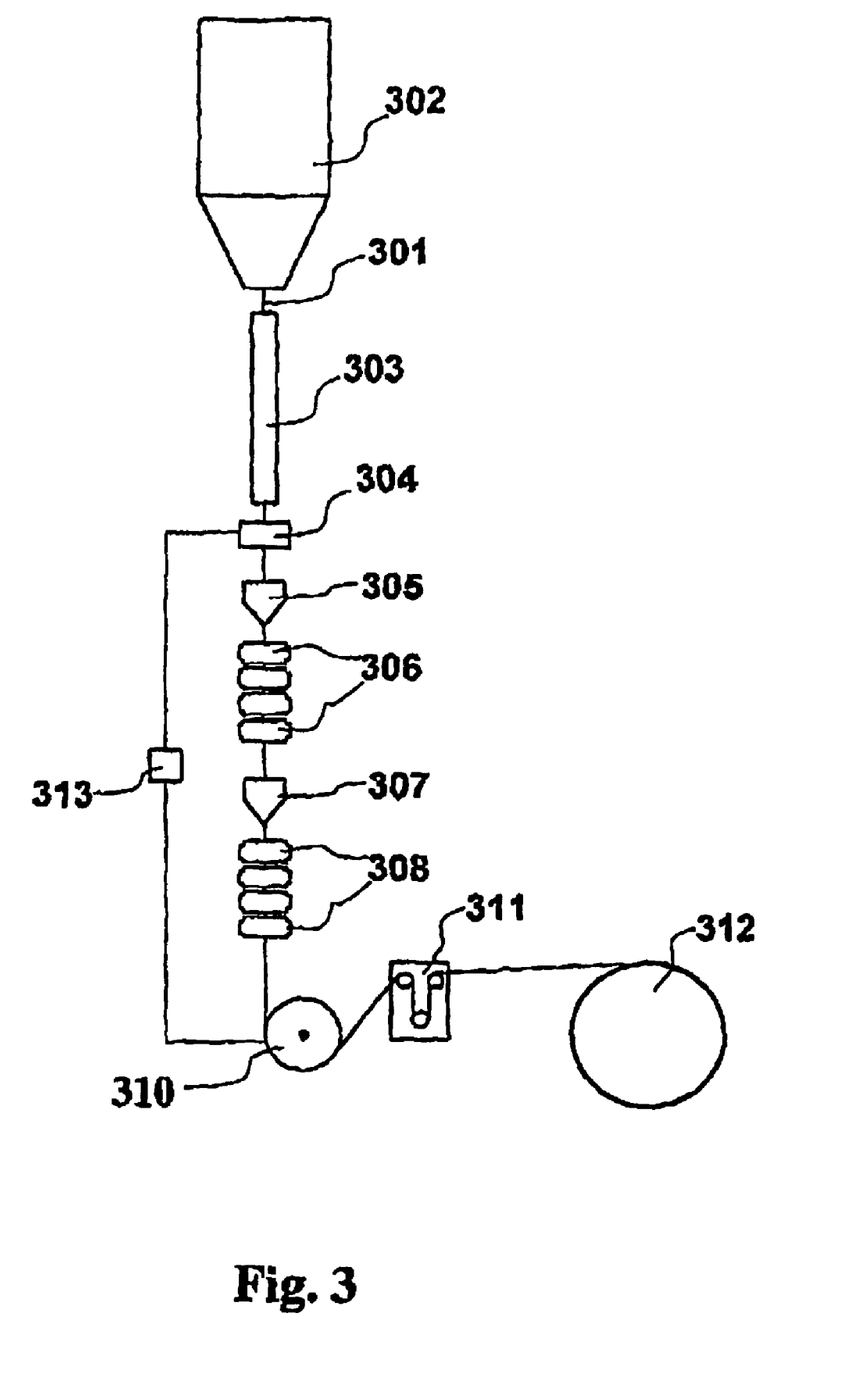
FIG. 3: is the general scheme of a system (drawing tower) for producing an optical fiber according to the present invention.

An optical fiber according to the present invention may be produced according to the usual drawing techniques by using, for example, a system such as the one illustrated diagrammatically in FIG. 3.

This system, commonly known as a "drawing tower", typically comprises a furnace (302) inside which is placed a glass optical preform to be drawn. The bottom part of said preform is heated to the softening point and drawn into an optical fiber (301). The fiber is then cooled, preferably in a temperature range of from about 35° C. to about 70° C., preferably in a suitable cooling tube (303) of the type described, for example, in patent application WO 99/26891, and passed through a diameter measurement device (304). This device is connected by means of a microprocessor (313) to a pulley (310) which regulates the drawing speed; in the event of any variation in the diameter of the fiber, the microprocessor (313) intervenes to regulate the rotational speed of the pulley (310), so as to keep the diameter of the optical fiber constant. Next, the fiber passes into a primary coating applicator (305), containing the coating composition in liquid form, and is covered with this composition to a thickness of about 25 μm-35 μm. The coated fiber is then passed into a UV oven (or a series of ovens) (306) in which the primary coating is crosslinked. The fiber covered with the crosslinked primary coating is then passed into a second applicator (307), in which it is coated with the secondary coating and then crosslinked in the relative UV oven (or series of ovens) (308). Alternatively, the application of the secondary coating may be carried out directly on the primary coating before the latter has been crosslinked, according to the "wet-on-wet" technique. In this case, a single applicator is used, which allows the sequential application of the two layers of coating, for example, of the type described in patent U.S. Pat. No. 4,474,830. The fiber thus covered is then crosslinked using one or more UV ovens similar to those used to crosslink the individual coatings.

If desired, the coating composition of the second coating layer may advantageously contain dye and/or pigment for providing the desired identification of the optical fiber.

In the case in which it is necessary to apply an outer coloured coating layer, the optical fiber passes through an ink applicator and a respective UV oven (not shown in FIG. 3).

Subsequent to the coating and to the crosslinking of this coating, the fiber may optionally be made to pass through a device (not shown in FIG. 3) capable of giving a predetermined twist to this fiber, for example of the type described in International Patent Application WO 99/67180, for the purpose of reducing the PMD ("Polarization Mode Dispersion") value of this fiber. The pulley (310) placed downstream of the devices illustrated previously controls the drawing speed of the fiber. After this drawing pulley, the fiber passes through a device (311) capable of controlling the tension of said fiber, of the type described, for example, in patent application EP 1,112,979, and is finally collected on a reel (312).

An optical fiber thus produced may be used as such in the production of optical cables. Alternatively, several optical fibers with a conventional coating may be combined in a ribbon of several fibers combined together by means of a common polymer coating ("common coating") that may be applied according to techniques known in the art, said common polymer coating optionally being obtained according to the present invention. The common polymer coating may be applied by arranging the optical fibers parallel to each other, passing them through a common polymer coating applicator (for example at a speed of 250-300 m/min) and crosslinking this coating using a suitable UV lamp.

The present invention will be further illustrated hereinbelow by means of a number of implementation examples that are provided purely as a guide and are non-limiting on the invention.

EXAMPLES 1-6

Preparation of the Coating Compositions

Six coating compositions were prepared. The amounts of the components for each composition (% by weight except where otherwise mentioned), are given in Table 1 wherein Examples 1-5 are according to the present invention as, Example 6, is a comparative example.

TABLE 1

| | EXAMPLE | | | | | |
|---|---|---|---|---|---|---|
| | 1 | 2 | 3 | 4 | 5 | 6 (*) |
| Ebecryl ® 600 | 70 | 70 | 65 | 50 | 70 | — |
| Vectomer ® 4020 | 30 | — | — | — | — | — |
| Vectomer ® 4010 | — | 30 | 30 | 30 | — | 30 |
| Vectomer ® 5015 | — | — | — | — | 30 | — |
| BR ® 304 | — | — | 5 | 20 | — | 70 |
| Darocur ® 1173 | 0.6 | 0.6 | 0.6 | 0.6 | 0.6 | 0.6 |
| UVI ® 6974 | 0.25 | 0.25 | 0.25 | 0.25 | 0.25 | 0.25 |

(*) comparative.
Ebecryl ® 600: bisphenol A epoxy diacrylate having an average molecular weight of about 600 (UCB Chemical);
Vectomer ® 4020: bis [4-(vinyloxymethyl)cyclohexyl-methyl]glutarate (Morflex Inc.);
Vectomer ® 4010: bis(4-vinyloxybutyl)isophthalate (Morflex Inc.);
Vectomer ® 5015: tris(4-vinyloxybutyl)trimellitate (Morflex Inc.);
BR ® 304: urethane acrylate oligomer having an average molecular weight of about 4000 (Bomar Specialties);
Darocur ® 1173: a free radical photoinitiator having 2-hydroxy-2-methyl-1-phenylpropan-1-one as the active component (Ciba) (the amount given is relative to 100 parts by weight of the other components);
UVI ® 6974: a cationic photoinitiator hexafluoroantimony triarylsulphonium salt, sold by Union Carbide, as a 50% dispersion in propylene carbonate (the amount given is relative to 100 parts by weight of the other components).

The components given in Table 1, were placed in a 100 ml becker and were kept under mechanical stirring for 2 hours at 40° C. Subsequently, the compositions were left to stand for at least 12 hours, at room temperature, so as to obtain a homogeneous composition free of bubbles.

EXAMPLE 7

Mechanical and Chemical-Physical Analysis

The compositions of Examples 1-6 were subjected to the following mechanical and chemical-physical analyses.

Viscosity

The temperatures at which the non-crosslinked compositions obtained according to Examples 1-6 reach a viscosity of 2000 mPa·s were determined by using a Brookfield rheometer type, model DV-III, equipped with a configuration 29, operating at 150 rpm. The obtained results are given in Table 2.

Modulus of Elasticity Value and Glass Transition Temperature ($T_g$)

Films were obtained from the abovementioned compositions by working as follows. A film having 120 mm×150 mm dimensions and 70 μm in thickness, was spread onto a glass plate using the "Doctor Blade" filmograph at a speed of 2 m per minute; the curing of the film was carried out using a Fusion UV curing System device, model F600 and lamp with spectrum D, applying a UV dose of 1.5 J/cm², operating in inert nitrogen atmosphere.

The films thus obtained were conditioned for 24 hours, at 25° C. and at 50% relative humidity, and removed from the glass plate. The films were then subjected to DMTA analysis (Dynamic Mechanical Thermal Analyser from Reometrics Inc.), to evaluate the modulus of elasticity and the glass transition temperature ($T_g$). The analysis was performed at a frequency of 1 Hz and at a heating rate of 2° C./min over the temperature range between −60° C. and 120° C. The glass transition temperature ($T_g$) corresponds to the tanδ peak. The obtained results are given in Table 2.

Elongation at Break Value and Stress at Break Value

Next, working as described above, films having 120 mm×150 mm dimensions and 70 μm in thickness were prepared. After crosslinking, films were conditioned for 24 hours, at 25° C. and at 50% relative humidity. Each film was then removed from the glass and samples having the following dimensions: 10 mm×15 mm×70 μm were obtained. The samples thus obtained were used to determine the elongation at break and the stress at break. The test was performed using an Instron dinamometer and working at a tensile speed of 25 mm/min. The obtained results are given in Table 2.

Water Absorption of the Crosslinked Films

The samples obtained as described above, predried in an atmosphere flushed with dry air for 48 hours, were subjected to controlled absorption of water. To this end, the Igasorp machine from Hiden Analytical was used, working at a temperature of 55° C., with a relative humidity of 95%. The test gives the asintotic value in the absorption of the water content.

The results obtained, expressed as a percentage absorption of water referred to the film weight, are given in Table 2.

TABLE 2

|  | EXAMPLE | | | | | |
| --- | --- | --- | --- | --- | --- | --- |
|  | 1 | 2 | 3 | 4 | 5 | 6 (*) |
| VISCOSITY (2000 mPa · s) | | | | | | |
| Temperature (° C.) | 46 | 40 | 42 | 44 | 45 | 39 |
| DMTA ANALYSIS (MPa) | | | | | | |
| −40° C. | 2600 | 3000 | 3000 | 2800 | 2900 | 60 |
| +25° C. | 1200 | 1400 | 1000 | 700 | 800 | 3 |
| +60° C. | 100 | 100 | 65 | 50 | 50 | 3 |
| $T_g$ (° C.) | 59 | 58 | 55 | 55 | 51 | −45 |
| INSTRON ANALYSIS | | | | | | |
| Elongation at break (% variation) | 5 | 7 | 5 | 9 | 10 | 45 |
| Stress at break (MPa) | 15 | 16 | 15 | 10 | 14 | 2 |
| WATER ABSORPTION | | | | | | |
| (%) | 2.7 | 2.6 | 2.7 | 2.6 | 2.8 | 3.2 |

(*) comparative.

EXAMPLE 8

Preparation of a Cationically Crosslinkable Composition for Primary Coating

A composition for primary coating was prepared: the amounts of the components (parts by weight except where otherwise mentioned) are given in Table 3.

TABLE 3

| COMPONENTS | COMPOSITION |
| --- | --- |
| Kraton ® Liquid EKP-207 | 50 |
| Kraton ® Liquid L-1203 | 50 |
| UVI ® 6974 | 1 |
| Dynasylan ® MTMO | 1 |
| BYK ® 361 | 0.5 |

Kraton ® Liquid EKP-207: linear oligomer containing a poly(ethylene/butylene) aliphatic chain, a hydroxyl group at the one end and epoxide groups at the other end (Kraton Polymer);
Kraton ® Liquid L-1203: hydroxy-terminated hydrogenated polydiene oligomer (Kraton Polymer);
UVI ® 6974: a cationic photoinitiator hexafluoroantimony triarylsulphonium salt, sold by Union Carbide, as a 50% dispersion in propylene carbonate (the amount given is relative to 100 parts by weight of Kraton Liquid);
Dynasylan ® MTMO: γ-mercaptopropyltrimethoxy silane (Degussa-Hüls) (the amount given is relative to 100 parts by weight of Kraton Liquid);
UVI ® 361: polyacrylate copolymer (BYK Chemie) (the amount given is relative to 100 parts by weight of Kraton Liquid).

The components given in Table 3 were placed in a 100 ml beaker and kept under stirring, at room temperature, for 1 hour. They were then left to stand overnight in order to obtain a homogeneous composition free of bubbles.

EXAMPLE 9

Adhesion on Primary Coating

The compositions of Example 1 and 2 were subjected to the following analysis.

Glass plates coated with films made from the compositions of Example 8 (primary coating) or from the commercial primary coating DeSolite® 3471-1-129 from DSM (as a comparison) and from the compositions of Example 1 and 2 (secondary coating according to the present invention) were obtained by working as follows. A film of primary coating (60 μm thick and 100 mm width) was spread onto a glass using the "Bird" filmograph at a speed of 2 m per minute; the crosslinking of the film was carried out using a Fusion UV curing System device, model F600 and lamp with spectrum H for the composition of Example 8 and spectrum D for DeSolite® 3471-1-129, applying a UV dose of 1.5 J/cm². At the end of the crosslinking, a composition for secondary coating prepared according to Example 1 and 2, was spread as a film (70 μm thick and 100 mm width) onto the said crosslinked film and was subjected to the crosslinking operating at the working conditions above disclosed but using a lamp with spectrum D.

The glass plates thus obtained were conditioned for 24 hours, at 25° C. and at 50% relative humidity, and were subsequently immersed in distilled water for 60 hours at 60° C. (aged samples). At the end of said ageing treatment, the coatings were visually checked to evaluate the adhesion between secondary and primary coating. For comparative purposes, the adhesion between secondary and primary coating was also evaluated on samples obtained from non-aged samples.

The results obtained are given in Table 4.

The samples tested were the following:

(A): Primary coating: Example 8;
    Secondary coating: Example 1;
(B): Primary coating: Example 8;
    Secondary coating: Example 2;
(C)(*): Primary coating: Example 8;
    Secondary coating: DeSolite® 3471-2-1;
(D): Primary coating: DeSolite® 3471-1-129;
    Secondary coating: Example 1;
(E): Primary coating: DeSolite® 3471-1-129;
    Secondary coating: Example 2.

TABLE 4

| EXAMPLE | NON-AGED SAMPLES | AGED SAMPLES |
|---|---|---|
| (A) | Good | Good |
| (B) | Good | Good |
| (C) (*) | Poor | Poor |
| (D) | Good | Good |
| (E) | Good | Good |

(*) comparative;
Good: no detachments between primary and secondary coating are found;
Poor: detachments between primary and secondary coating are found.

EXAMPLE 10

Adhesion on Acrylic Inks

The compositions of Example 1 and 2 were subjected to the following analysis.

Glass plates coated with films made from the compositions of Example 1 and 2 (secondary coating according to the present invention), or from the commercial secondary coating DeSolite 3471-2-1 from DSM (as a comparison) and from a film of Cablelite® LTS red 3287-11-2 from DSM or of Cablelite® LTS blue 3287-11-26 from DSM were obtained by working as follows. A film of secondary coating (70 μm thick and 100 mm width) was spread onto a glass plate using the "Bird" filmograph at a speed of 2 m per minute; the crosslinking of the film was carried out using a Fusion UV curing System device, model F600 and lamp with spectrum D, applying a UV dose of 1.5 J/cm². At the end of the crosslinking, a film of Cablelite® LTS red 3287-11-2 or of Cablelite® LTS blue 3287-11-26, was spread as a film (5 μm thick and 100 mm width) onto the said crosslinked film and was subjected to the crosslinking operating at the working conditions above disclosed but applying a UV dose of 2.3 J/cm².

The glass plates thus obtained were conditioned for 24 hours, at 25° C. and at 50% relative humidity, and were subsequently immersed in distilled water for 60 hours at 60° C. (aged samples). At the end of said ageing treatment, the coatings were visually checked to evaluate the adhesion between secondary coating and ink. For comparative purposes, the adhesion between secondary coating and ink was also evaluated on samples obtained from non-aged samples.

The results obtained are given in Table 5.
The samples tested were the following:
(F): Secondary coating: Example 2;
    Ink coating: Cablelite® LTS red 3287-11-2;
(G): Secondary coating: Example 2;
    Ink coating: Cablelite® LTS blue 3287-11-26.

TABLE 5

| EXAMPLE | AGED SAMPLES | NON-AGED SAMPLES |
|---|---|---|
| (F) | Good | Good |
| (G) | Good | Good |

Good: no detachments between secondary coating and ink are found.

The invention claimed is:

1. A crosslinkable composition comprising:
   (a) at least one radically crosslinkable oligomer containing at least two reactive functional groups and having a number average molecular weight lower than about 1,000;
   (b) at least one cationically crosslinkable compound containing at least one reactive functional group, wherein the cationically crosslinkable compound is selected from vinyl ether terminated ester compounds having the following general formula:

wherein:
   n is an integer from 1 to 4 inclusive;
   Y is a mono- di-, tri, or tetra-functional radical having a molecular weight of about 12 to about 500 and is independently selected from the group consisting of alkyl, aryl, arylalkyl, and cycloalkyl radicals;
   X is a divalent radical having a molecular weight of about 25 to about 500, each X being independently selected from the group consisting of alkylene and cycloalkylene radicals; and
   $R_1$ and $R_2$, are monovalent radicals which are independently selected from the group consisting of hydrogen and alkyl groups having from 1 to 20 carbon atoms;
   (c) at least one free radical photoinitiator; and
   (d) at least one cationic photoinitiator.

2. The crosslinkable composition according to claim 1, wherein the radically crosslinkable oligomer (a) comprises a carbon-containing backbone structure to which the reactive functional group or groups are bound.

3. The crosslinkable composition according to claim 1, wherein the free radical photoinitiator (c) is selected from radical photo-initiators known as Norrish Type I and Norrish Type II.

4. The crosslinkable composition according to claim 1, wherein the cationic photoinitiator (d) is selected from triarylsulphonium salts or diaryliodonium salts having non-nucleophilic anions, hexafluorophosphorus triarylsulphonium salts, hexafluoroantimony triarylsulphonium salts, (tolylcumyl) -tetrakis(pentafluorophenyl)iodonium salts, diaryl iodonium hexafluoroantimonate salts, 4-isobutylphenyl-4'-methylphenyliodonium hexafluorophosphorus salts, or mixtures thereof.

5. The crosslinkable composition according to claim 1, further comprising at least one photosensitizer (g).

6. The crosslinkable composition according to claim 1, further comprising at least one radically crosslinkable oligomer (e).

7. The crosslinkable composition according to claim 1, further comprising at least one release agent (f).

8. A method of using a composition to form an optical fiber comprising surrounding a glass portion with at least one coating of crosslinked polymer material, wherein said coating is obtained by crosslinking a composition comprising:
   (a) at least one radically crosslinkable oligomer containing at least two reactive functional groups and having a number average molecular weight lower than about 1,000;
   (b) at least one cationically crosslinkable compound containing at least one reactive functional group, wherein the cationically crosslinkable compound is selected from vinyl ether terminated ester compounds having the following general formula:

wherein:
n is an integer from 1 to 4 inclusive;
Y is a mono- di-, tri, or tetra-functional radical having a molecular weight of about 12 to about 500 and is independently selected from the group consisting of alkyl, aryl, arylalkyl, and cycloalkyl radicals;
X is a divalent radical having a molecular weight of about 25 to about 500, each X being independently selected from the group consisting of alkylene and cycloalkylene radicals; and
$R_1 R_2$, are monovalent radicals which are independently selected from the group consisting of hydrogen and alkyl groups having from 1 to 20 carbon atoms;
(c) at least one free radical photoinitiator; and
(d) at least one cationic photoinitiator.

9. A method of using a composition to form the optical fiber according to claim 8, wherein the radically crosslinkable oligomer (a) has a number average molecular weight of about 400 to about 900.

10. A method of using a composition to form the optical fiber according to claim 8, wherein the composition further comprises (e) at least one radically crosslinkable oligomer containing at least one reactive functional group and having a number average molecular weight higher than about 1,000.

11. A method of using a composition to form the optical fiber according to claim 8, wherein the coating is a secondary coating surrounding a primary coating.

12. A method of using a composition to form the optical fiber according to claim 8, wherein the composition has a viscosity of about 1,000 mPa·s to about 4,000 mPa·s in a temperature range of about 25° C. to about 80° C.

13. A method of using a composition to form the optical fiber according to claim 12, wherein the composition has a viscosity of about 1,500 mPa·s to about 3,000 mPa·s in a temperature range of about 25° C. to about 80° C.

14. A method of using a composition to form the optical fiber according to claim 8, wherein the polymer material has a modulus of elasticity at −40° C. of about 1,500 MPa to about 4,000 MPa.

15. A method of using a composition to form the optical fiber according to claim 14, wherein the polymer material has a modulus of elasticity at −40° C. of about 2,500 MPa to about 3,500 MPa.

16. A method of using a composition to form the optical fiber according to claim 8, wherein the polymer material has a modulus of elasticity at +25° C. of about 500 MPa to about 2,000 MPa.

17. A method of using a composition to form the optical fiber according to claim 16, wherein the polymer material has a modulus of elasticity at +25° C. of about 650 MPa to about 1,500 MPa.

18. A method of using a composition to form the optical fiber according to claim 8, wherein the polymer material has a modulus of elasticity at +60° C. of about 30 MPa to about 300 MPa.

19. A method of using a composition to form the optical fiber according to claim 18, wherein the polymer material has a modulus of elasticity at +60° C. of about 40 MPa to about 150 MPa.

20. A method of using a composition to form the optical fiber according to claim 8, wherein the polymer material has a glass transition temperature ($T_g$) of about 45° C. to about 85° C.

21. A method of using a composition to form the optical fiber according to claim 20, wherein the polymer material has a glass transition temperature ($T_g$) of about 50° C. to about 70° C.

22. A method of using a composition to form the optical fiber according to claim 8, wherein the coating has a thickness of about 10 μm to about 70 μm.

23. A method of using a composition to form the optical fiber according to claim 22, wherein the coating has a thickness of about 20 μm to about 35 μm.

24. A method of using a composition to form the optical fiber according to claim 8, wherein the radically crosslinkable oligomer (a) comprises a carbon-containing backbone structure to which the reactive functional group or groups are bound.

25. A method of using a composition to form the optical fiber according to claim 24, wherein the carbon containing backbone structure comprises polyethers, polyolefins, polyesters, polyamides, polycarbonates, or polyacrylates.

26. A method of using a composition to form the optical fiber according to claim 24, wherein the radically crosslinkable oligomer (a) is represented by the following formulae:

wherein R is a radiation-curable functional group, Ar is an aromatic group containing moiety, and L is a linking group.

27. A method of using a composition to form the optical fiber according to claim 26, wherein the linking group comprises alkoxy or ring opened epoxy, ethoxy, propoxy, butoxy, and repeat units thereof, or a urethane or urea linking group.

28. A method of using a composition to form the optical fiber according to claim 26, wherein the aromatic group is derived from bisphenol units, bisphenol A or bisphenol F.

29. A method of using a composition to form the optical fiber according to claim 28, wherein the radically crosslinkable oligomer (a) is a diglycidyl ether derivative of bisphenol A to which acrylate functional groups have been bound.

30. A method of using a composition to form the optical fiber according to claim 29, wherein the radically crosslinkable oligomer (a) is a bisphenol A epoxy diacrylate.

31. A method of using a composition to form the optical fiber according to claim 14, wherein the radically crosslinkable oligomer (a) is present in the composition in an amount of about 30% by weight to about 90% by weight with respect to the total weight of (a)+(b)+(e).

32. A method of using a composition to form the optical fiber according to claim 31, wherein the radically crosslinkable oligomer (a) is present in the composition in an amount of about 40% by weight to about 80% by weight with respect to the total weight of (a)+(b)+(e).

33. A method of using a composition to form the optical fiber according to claim 10, wherein the cationically crosslinkable compound (b) is present in the composition in an amount of about 10% by weight to about 70% by weight with respect to the total weight of (a)+(b)+(e).

34. A method of using a composition to form the optical fiber according to claim 33, wherein the cationically crosslinkable compound (b) is present in the composition in an amount of about 20% by weight to about 60% by weight with respect to the total weight of (a)+(b)+(e).

35. A method of using a composition to form the optical fiber according to claim 8, wherein the free radical photoinitiator (c) is selected from Norrish Type I and Norrish Type II radical photo-initiators.

36. A method of using a composition to form the optical fiber according to claim 35, wherein the Norrish Type I radical photoinitiator is selected from benzoin derivatives, methylbenzoin derivatives or 4-benzoyl-1,3-dioxolane derivatives, benzyl ketals, (α, α-dialkoxy)acetophenones, (α-hydroxy)alkylphenones, (α-amino)alkylphenones, acylphosphine oxides, acylphosphine sulphides, o-acyl-α-oximino ketones, halogenated acetophenone derivatives, benzoyldiarylphosphine oxides, or mixtures thereof.

37. A method of using a composition to form the optical fiber according to claim 35, wherein the Norrish Type II radical photoinitiator is selected from aromatic ketones, benzophenone, xanthone, benzophenone derivatives, Michler's ketones, thioxanthones, xanthone derivatives, ITX (isopropyl thioxanthone), or mixtures thereof.

38. A method of using a composition to form the optical fiber according to claim 10, wherein the free radical photoinitiator (c) is present in the composition in an amount of about 0.01 part by weight to about 10 parts by weight with respect to 100 parts by weight of (a)+(b)+(e).

39. A method of using a composition to form the optical fiber according to claim 38, wherein the free radical photoinitiator (c) is present in the composition in an amount of about 0.05 part by weight to about 8 parts by weight with respect to 100 parts by weight of (a)+(b)+(e).

40. A method of using a composition to form the optical fiber according to claim 8, wherein the cationic photoinitiator (d) is selected from triarylsulphonium salts or diaryliodonium salts having non-nucleophilic anions, hexafluorophosphorus triarylsulphonium salts, hexafluoroantimony triarylsulphonium salts, (tolylcumyl)-tetrakis(pentafluorophenyl)iodonium salts, diaryl iodonium hexafluoroantimonate salts, 4-isobutylphenyl-4'-methylphenylodonium hexafluorophosphorus salts, or mixtures thereof.

41. A method of using a composition to form the optical fiber according to claim 10, wherein the cationic photoinitiator (d) is present in the composition in an amount of about 0.05 part by weight to about 5 parts by weight with respect to 100 parts by weight of (a)+(b)+(e).

42. A method of using a composition to form the optical fiber according to claim 41, wherein the cationic photoinitiator (d) is present in the composition in an amount of from 0.25 part by weight to about 2 parts by weight with respect to 100 parts by weight of (a)+(b)+(e).

43. A method of using a composition to form the optical fiber according to claim 8, wherein the composition further comprises at least one photosensitizer (g).

44. A method of using a composition to form the optical fiber according to claim 43, wherein the photosensitizer (g) is selected from: amines, ureas, phosphorus compounds, sulfur compounds, nitrils, or mixtures thereof.

45. A method of using a composition to form the optical fiber according to claim 43, wherein the photosensitizer (g) is present in the composition in an amount of about 0.1 part by weight to about 5 parts by weight with respect to 100 parts by weight of (a)+(b)+(e).

46. A method of using a composition to form the optical fiber according to claim 45, wherein the photosensitizer (g) is present in the composition in an amount of about 0.4 part by weight to about 2 parts by weight with respect to 100 parts by weight of (a)+(b)+(e).

47. A method of using a composition to form the optical fiber according to claim 10, wherein the radically crosslinkable oligomer (e) may be selected from ethylenically unsaturated urethanes obtained by reacting the following compounds:

(A) at least one polyol compound comprising a structural unit represented by the following formula (I):

wherein n is an integer from 0 to 4 inclusive; $R_1, R_2, R_3, R_4, R_5$ and $R_6$, which may be equal or different from each other, represent a hydrogen atom or a $C_1$-$C_4$ alkyl group;

(B) at least one isocyanate compound; and (C) at least one (meth)acrylate compound containing at least one hydroxyl group.

48. A method of using a composition to form the optical fiber according to claim 47, wherein the radically crosslinkable oligomer (e) is present in the composition in an amount of about 0% by weight to about 30% by weight with respect to the total weight of (a)+(b)+(e).

49. A method of using a composition to form the optical fiber according to claim 48, wherein the radically crosslinkable oligomer (e) is present in the composition in an amount of about 0.1% by weight to about 20% by weight with respect to the total weight of (a)+(b)+(e).

50. A method of using a composition to form the optical fiber according to claim 8, wherein the composition further comprises (f) at least one release agent.

51. A method of using a composition to form the optical fiber according to claim 50, wherein the release agent (f) is a reactive type and is selected from acrylated silicones, vinyl-functional silicones, mercapto-functional silicones, (meth)acrylate-functional fluorocarbons, vinyl-functional fluorocarbons, mercapto-functional fluorocarbons, or mixtures thereof.

52. A method of using a composition to form the optical fiber according to claim 50, wherein the release agent (f) of reactive type is present in the composition in an amount of about 0 part by weight to about 15 parts by weight with respect to 100 parts by weight of (a)+(b)+(e).

53. A method of using a composition to form the optical fiber according to claim 52, wherein the release agent (f) of reactive type is present in the composition in an amount of about 0.2 part by weight to about 10 parts by weight with respect to 100 parts by weight of (a)+(b)+(e).

54. A method of using a composition to form the optical fiber according to claim 50, wherein the release agent (f) is a non-reactive type and is selected from silicone copolymers, hydrocarbon-like paraffin wax, fluorocarbons, or mixtures thereof.

55. A method of using a composition to form the optical fiber according to claim 54, wherein the release agent (f) of non-reactive type is present in the composition in an amount of about 0 part by weight to about 3 parts by weight with respect to 100 parts by weight of (a)+(b)+(e).

56. A method of using a composition to form the optical fiber according to claim 55, wherein the release agent (f) of non-reactive type is present in the composition in an amount of about 0.1 part by weight to about 2 parts by weight, with respect to 100 parts by weight of (a)+(b)+(e).

57. A method of using a composition to form an optical fiber comprising surrounding a glass portion with at least one coating of crosslinked polymer material, wherein said coating is obtained by crosslinking a composition comprising:
(a) at least one radically crosslinkable oligomer containing at least two reactive functional groups and having a number average molecular weight lower than about 1,000;
wherein said at least one radically crosslinkable oligomer is represented by the following formulae:

wherein R is a radiation-curable functional group, Ar is an aromatic group containing moiety, and L is a linking group;
(b) at least one cationically crosslinkable compound containing at least one reactive functional group,
wherein the cationically crosslinkable compound is selected from vinyl ether terminated ester compounds having the following general formula:

wherein:
n is an integer from 1 to 4 inclusive;
Y is a mono- di-, tri, or tetra-functional radical having a molecular weight of about 12 to about 500 and is independently selected from the group consisting of alkyl, aryl, arylalkyl, and cycloalkyl radicals;
X is a divalent radical having a molecular weight of about 25 to about 500, each X being independently selected from the group consisting of alkylene and cycloalkylene radicals; and
$R_1$ and $R_2$, are monovalent radicals which are independently selected from the group consisting of hydrogen and alkyl groups having from 1 to 20 carbon atoms;
(c) at least one free radical photoinitiator; and
(d) at least one cationic photoinitiator.

58. A method of using a composition to form a ribbon of optical fibers comprising arranged in parallel and enclosing in a common coating of crosslinked polymer material said optical fibers, wherein said common coating being obtained by crosslinking a composition comprising:
(a) at least one radically crosslinkable oligomer containing at least two reactive functional groups and having a number average molecular weight lower than about 1,100;
(b) at least one cationically crosslinkable compound containing at least one reactive functional group,
wherein the cationically crosslinkable compound is selected from vinyl ether terminated ester compounds having the following general formula:

wherein:
n is an integer from 1 to 4 inclusive;
Y is a mono- di-, tri, or tetra-functional radical having a molecular weight of about 12 to about 500 and is independently selected from the group consisting of alkyl, aryl, arylalkyl, and cycloalkyl radicals;
X is a divalent radical having a molecular weight of about 25 to about 500, each X being independently selected from the group consisting of alkylene and cycloalkylene radicals; and
$R_1$ and $R_2$ are monovalent radicals which are independently selected from the group consisting of hydrogen and alkyl groups having from 1 to 20 carbon atoms;
(c) at least one free radical photoinitiator; and
(d) at least one cationic photoinitiator.

59. A method of using a composition to form the ribbon of optical fibers according to claim 58, wherein at least one of the optical fibers comprises a glass portion and at least one coating of crosslinked polymer material obtained by crosslinking a composition comprising (a), (b), (c), and (d),
optionally (e) at least one radically crosslinkable oligomer containing at least one functional group and having a number average molecular weight higher than about 1,000
optionally (f) at least one release agent; and
optionally (g) at least one photosensitizer.

60. A method of using a composition to form the ribbon of optical fibers according to claim 58, wherein the radically crosslinkable oligomer (a) comprises a carbon-containing backbone structure to which the reactive functional group or groups are bound.

61. A method of using a composition to form the ribbon of optical fibers according to claim 58, wherein the free radical photoinitiator (c) is selected from radical photo-initiators known as Norrish Type I and Norrish Type II.

62. A method of using a composition to form the ribbon of optical fibers according to claim 58, wherein the cationic photoinitiator (d) is selected from triarylsulphonium salts or diaryliodonium salts having non-nucleophilic anions, hexafluorophosphorus triarylsulphonium salts, hexafluoroantimony triarylsulphonium salts,(tolylcumyl)-tetrakis(pentafluorophenyl)iodonium salts, diaryl iodonium hexafuoroantimonate salts, 4-isobutylphenyl-4'-methylphenyliodonium hexafluorophosophorus salts, or mixtures thereof.

63. A method of using a composition to form the ribbon of optical fibers according to claim 58, further comprising at least one photosensitizer (g).

64. A method of using a composition to form the ribbon of optical fibers according to claim 58, further comprising at least one radically crosslinkable oligomer (e).

65. A method of using a composition to form the ribbon of optical fibers according to claim 58, further comprising at least one release agent (f).

* * * * *